United States Patent
Collette

(10) Patent No.: US 7,177,411 B1
(45) Date of Patent: Feb. 13, 2007

(54) SYSTEM FOR IMPLEMENTING TELEPHONE SERVICES, CONTROL UNIT FOR AN AUTOMATIC SWITCH AND TELEPHONE AND COMPUTER INTEGRATION SERVER

(75) Inventor: Christian Collette, Verson (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 10/031,245

(22) PCT Filed: Apr. 18, 2000

(86) PCT No.: PCT/FR00/01012

§ 371 (c)(1),
(2), (4) Date: Apr. 29, 2002

(87) PCT Pub. No.: WO00/64198

PCT Pub. Date: Oct. 26, 2000

(30) Foreign Application Priority Data

Apr. 19, 1999 (FR) ................................. 99 04905

(51) Int. Cl.
*H04M 3/42* (2006.01)
*H04M 7/00* (2006.01)

(52) U.S. Cl. .................. 379/201.12; 379/207.02; 379/225

(58) Field of Classification Search ........... 379/201.01, 379/201.12, 207.02, 219, 225
See application file for complete search history.

(56) References Cited

U.S. PATENT DOCUMENTS 5,742,596 A 4/1998 Baratz et al. ............... 370/356
5,905,792 A * 5/1999 Miloslavsky ........... 379/265.11
6,094,479 A 7/2000 Lindeberg et al. ...... 379/220.01
6,141,545 A * 10/2000 Begeja et al. ............... 455/417

FOREIGN PATENT DOCUMENTS

| GB | 2 336 969 | 11/1999 |
|---|---|---|
| WO | WO94/21091 A1 | 9/1994 |
| WO | WO94/21094 A1 | 9/1994 |
| WO | WO 97/06625 | 2/1997 |
| WO | WO 97/50235 | 12/1997 |
| WO | WO 98/51092 | 11/1998 |

OTHER PUBLICATIONS

Goldberg: CTI:Computer/Phone Fusion at Lan's Edge *Electronic Design US*, vol. 42, No. 22, pp. 77-78, 80-82, 84, Oct. 1994.

* cited by examiner

*Primary Examiner*—Harry S. Hong
(74) *Attorney, Agent, or Firm*—Patterson, Thuente, Skaar & Christensen, P.A.

(57) ABSTRACT

A system for implementing telephone services on one or more telephone installations, themselves having several telephone terminals managed by one or more private automatic branch exchanges. To this end, the system has a piece of server type computer equipment, accessible by a computer network, and one or more interfaces capable of sending signaling control signals corresponding to the service or services requested to drive one or more automatic branch exchanges, these interfaces being connected for this purpose to telephone lines of the automatic branch exchanges.

18 Claims, 2 Drawing Sheets

SYSTEM FOR IMPLEMENTING TELEPHONE SERVICES, CONTROL UNIT FOR AN AUTOMATIC SWITCH AND TELEPHONE AND COMPUTER INTEGRATION SERVER

BACKGROUND OF THE INVENTION

The invention relates to a system for implementing telephone services in one or more telephone installations comprising several telephone terminals managed by at least one private automatic branch exchange. This also relates to a control device for an automatic branch exchange and a CTI server.

The invention can be applied to services offered by systems known as CTI systems or computer telephony integration systems.

These are services that can presently be offered only to installations having recent-model automatic branch exchanges with a CTI link.

It may be recalled that a private automatic branch exchange is also known by the abbreviation PABX.

Furthermore, the term telephone terminal refers to any piece of equipment or telephone set used to access the switched telephone network (STN).

FIG. 1 is a drawing of a system offering computer telephony integration services according to the recent prior art.

There is thus a telephone installation 1 comprising telephone terminals 10 and a recent-generation automatic branch exchange 20 connected firstly to the switched telephone network STN and, secondly, to a piece of computer equipment 30 by means of a CTI link. This site also has telecommunications equipment 11A, 11B, 11C (computer equipment for example) connected by a telecommunications network to a voice telecommunications server and/or to a WEB server 50.

An authorized user who, by virtue of this fact, possesses a secret key to access the services rendered by the CTI server 30 may request these services by means of the pieces of equipment 11A or 11B if he is at the site on which the PABX 20 is installed. However, he can also request these services from outside using a piece of equipment 11C to access the CTI server through the voice server and/or the WEB site 50.

A CTI link generally complies with a standard protocol used in the market but this protocol is adapted and interpreted differently from one builder to another. Secondly, this link evolves for a given PABX with the different versions of PABX.

This implies that the CTI server must propose management systems (or drivers) by model and by version of PABX.

The management of a CTI server therefore becomes difficult and the updating operations are frequent. Furthermore, the CTI links do not always take the telephone call transfer function and the CTI server drives only one PABX at a time.

The computer equipment 30 is connected to a remote server used to offer telecommunications services.

The link between the computer equipment 30 and the server 50 is obtained through a computer network on which the communications protocol used is the TCP/IP protocol.

To date, there are few systems of the kind just described. These are indeed systems by which it is possible to provide relatively recent-generation services. Only the new generation automatic branch exchanges possess this possibility of having a computer telephony integration link with a piece of computer equipment.

The use of such CTI links proposed by PABX manufacturers in order to create certain telephone services are generally costly and their implementation differs from one PABX to another. Furthermore, as has just been pointed out, the CTI link is available only on recent-generation PABX devices.

OBJECTS AND SUMMARY OF THE INVENTION

The present invention is therefore aimed at offering fully secured CTI (computer telephony integration) services at low cost on any telephone installation, without its being necessary to use recent-generation PABXs. These CTI services may be provided by means of a single CTI server on one or more different telephone installations through an interface connected to each telephone network.

The invention also lowers costs if there is a recent-generation PABX available since it is not necessary, with the system proposed by the present invention, to use a CTI link, which is a particularly costly link.

An object of the invention therefore is a system for implementing telephone services on one or more telephone installations themselves comprising several telephone terminals managed by one or more private automatic branch exchanges, characterized chiefly in that said system comprises a piece of server type computer equipment, accessible by a computer network, and one or more interfaces capable of sending signalling control signals corresponding to the services requested to drive one or more automatic branch exchanges, these interfaces being connected for this purpose to telephone lines of automatic branch exchanges.

The telephone service commands sent by the server are call transfer and automatic call-back commands or services pertaining to incoming calls.

Indeed, according to another characteristic of the invention, the telephone service requested may be the programming of call transfers of an automatic branch exchange station.

The call transfer is an automatic transfer of calls addressed to a telephone terminal of an installation to another terminal of this installation or to a terminal external to this installation.

According to another characteristic of the invention, the telephone service requested may be the automatic calling back of a terminal of the calling party in order to connect it with a called terminal.

The terminal of the calling party may be a terminal internal or external to a telephone installation and the called terminal may be a terminal internal or external to this telephone installation.

The driving of the interfaces connected with the automatic branch exchanges by the CTI server is secured by an authentication procedure or by the enciphering of the messages sent.

An object of the invention is also a telecommunications server (CTI) characterized chiefly in that it is connected to one or more private automatic branch exchanges (PABX) by means of a computer link through at least one interface connected by telephone lines to said automatic branch exchange or exchanges in order to drive this automatic branch exchange or these automatic branch exchanges to obtain telephone services, said automatic branch exchanges possibly being of different technologies.

The interface or interfaces are capable of generating signals corresponding to telephone service commands received from the server.

The invention also relates to a device for controlling a private automatic branch exchange (PABX) characterized chiefly in that it uses the telephone lines of the automatic branch exchange to convey signals corresponding to telephone service commands.

This device comprises an interface capable of sending signalling control signals on the telephone lines of at least one automatic branch exchange.

The control device is connected to a telecommunications server by a computer link to receive telephone service commands through this link.

The interface comprises one or more analog or digital modems and a coupler used to connect this modem or these modems to the computer link.

According to another characteristic, the interface takes the form of packs and this interface is secured.

The telephone lines connecting the interface to an automatic branch exchange are analog or digital lines.

The signalling control signals are DTMF or ISDN or voice signals.

Thus, the system proposed by the invention enables fully secured access to a telecommunications service on PABX by using an economical interface including analog or digital modems connected to a number of analog or digital channels (ISDN lines) of the PABX. This interface is driven through the IP protocol in fully secured mode. It can be used to provide remote transfer functions for stations that are in the installations and are driven by the PABX, and also the automatic call-back function for example through a distant WEB server, of the PABXs, etc.

It can also be used to provide incoming services (incoming calls) used for example for the dynamic assigning of an incoming call, addressed to a user, or a particular service, to a number or a list of numbers derived from the user profile stored for example in a database.

Indeed, the interface can be used in a large majority of the PABXs in the market without requiring that the client using the installation should purchase CTI links which are often costly.

Through the use of this interface, functions such as the programming of transfers from telephone sets in the installation managed by the PABX, the automatic call-back of a terminal of the calling party to connect him with a called terminal as well as the management of the incoming calls can be carried out remotely for a moderate cost.

A CTI server can drive one or more interfaces, each of them being connected to one or more PABXs.

BRIEF DESCRIPTION OF THE DRAWINGS

Other features and advantages of the invention shall appear more clearly from the following description made by way of a non-restrictive illustration and with reference to the appended drawings, of which.

DESCRIPTION OF THE PREFERRED EMBODIMENTS

Figure 1:
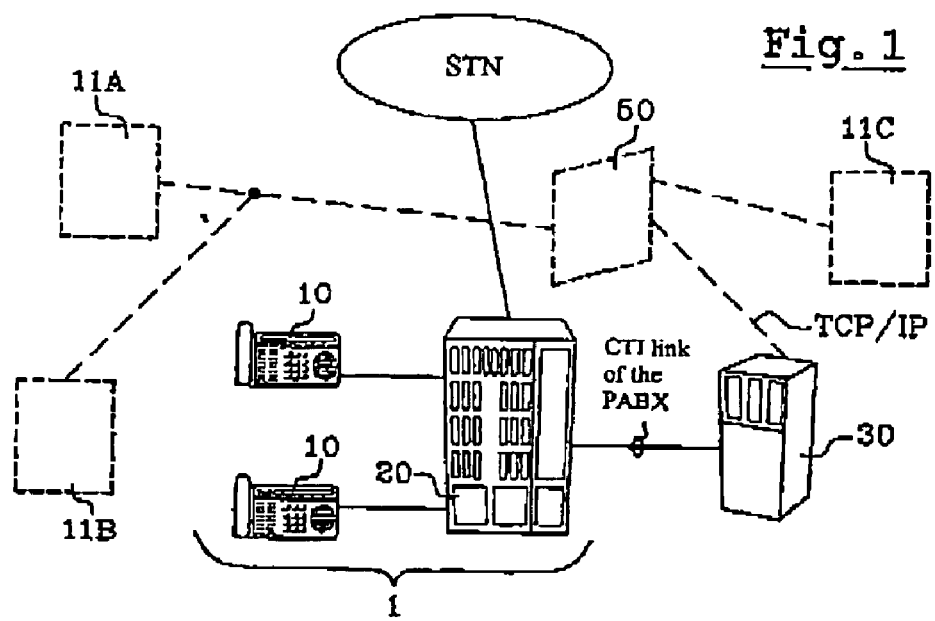
FIG. 1 shows a computer telephony integration system according to the prior art for the implementation of telephone services according to the invention.
Figure 2A:
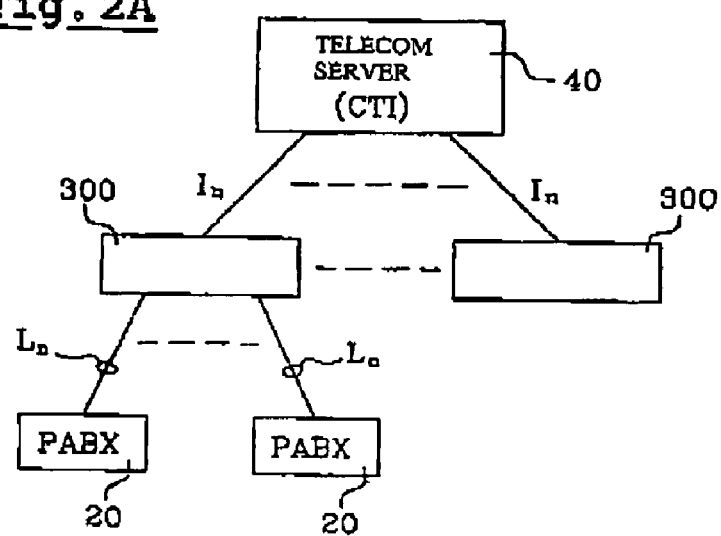
FIG. 2A shows a system for the implementation of the telephone services according to the present invention.

A control device 300 can be used as shown in FIG. 2A to drive one or more automatic branch exchanges 20 through telephone lines L1, . . . , Ln. It is connected for this purpose with a telecommunications server (CTI server) 40 by a computer link In. The server may be connected to several devices 300 by computer links.

Figure 2B:
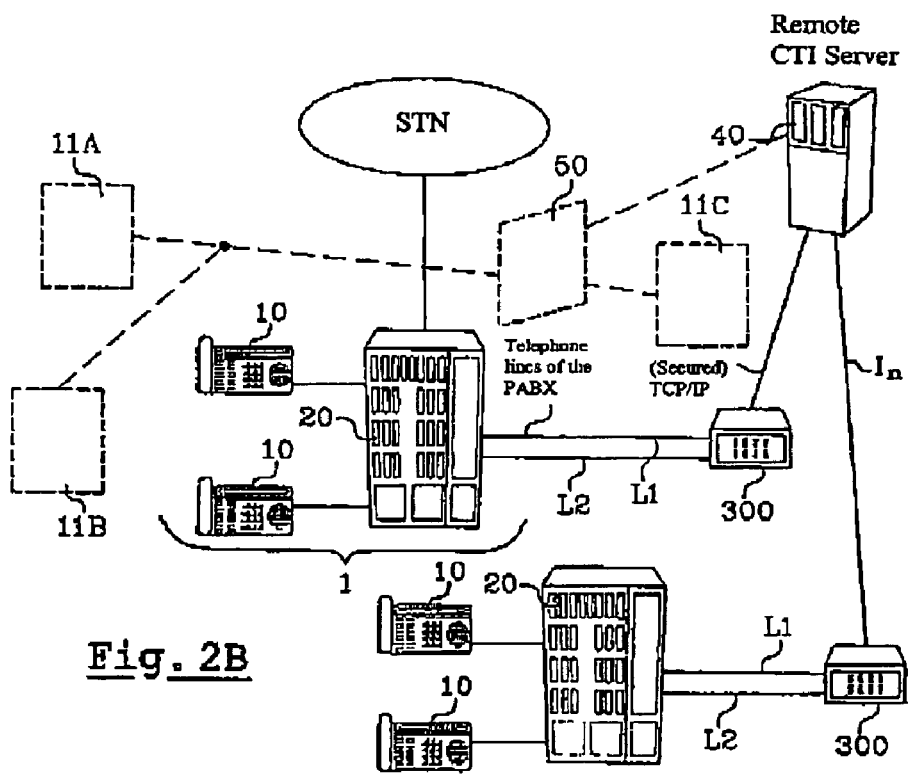
FIG. 2B shows a system according to the invention implemented and illustrating a telephone installation in greater detail.
Figure 3:
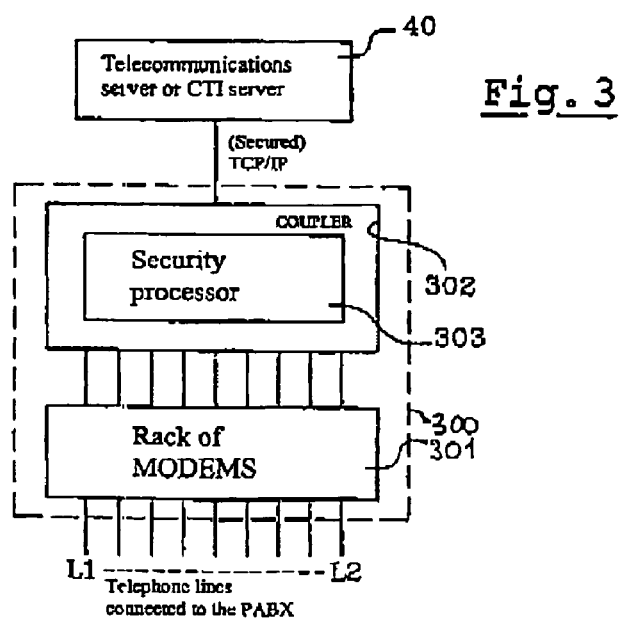
FIG. 3 shows a detail of an embodiment of an interface 300.

In practice, as can be seen in FIG. 2B, this device is a computer telephony integration (CTI) interface 300 made in the form of packs that are connected to the automatic branch exchange 20 by one or more analog or digital telephone lines L1, Ln available on this automatic branch exchange and to a remote CTI server type computer device 40 by a computer network.

The link between the CTI server 40 and the interfaces 300 is preferably secured. The securing of the link is done for example by any known enciphering algorithm. The exchanges are done according to the TCP/IP protocol.

The interface 300 is capable of configuring the PABX to enable the service for programming remote transfers from a telecommunications terminal or telephone set of the installation, managed by this PABX (the automatic branch exchange 20).

For this purpose, the interface generates for example a DTMF (Dual Tone Multifrequency) sequence or an ISDN sequence or a voice sequence corresponding to the control signals received from the CTI server to program the PABX according to the service required.

This remote telephone transfer function is useful in the telecommuting context.

The interface 300 is therefore connected to a few analog channels (or digital channels) V1 to Vn of the PABX 20.

The remote server 40 drives one or more interfaces 300 according to the secured IP protocol, using a conventional technique that is recalled here above.

The control parameters that will be sent in the case of this function will be the number of the telephone set whose call is to be transferred (managed by the PABX), the telephone number of the transfer, the confidential code of the telephone set of the user entitled to the service, the PABX telephone set substitution code and the PABX transfer codes.

Another possible service is the automatic call-back function used to connect the caller and the called party, by which it is possible to get called back if a user is outside or inside the company premises and if this user wishes to call a telephone inside or outside the PABX of the company.

In this case, the CTI server 40 drives an interface so that the interface first of all calls the requesting party and then makes a double call to call the requested number and then carries out either a transfer or a conferencing operation.

In the case of a conferencing operation, the interface may be silent and may also stop the calls since it controls the line.

This service can advantageously be used to request on-line services in the event of a teleconference, for example by sending DTMF codes during communication.

Other services can also be envisaged such as getting called back to listen to voice messages synthesized by the interface from the telephone installation 1 which houses the interface or getting called back to record a voice message. In this case, of course, the person who is called back will not incur the costs of communication. These costs will be transferred to those of the telephone installation of the company in which the telephone unit that is calling back is installed.

This system can also be used to provide incoming services on incoming calls, enabling the assigning of these calls to a number or a list of numbers internal or external to the PABX. This assigning can be done dynamically, through the interface and the CTI server. The digital lines connected to the interface can make this service even more speedy and efficient.

Another service may consist of the use of this interface to synchronize the call transfer requests programmed for a telephone number on an operator's smart network and for the telephone set of this user on PABX for calls internal to the PABX or to the PABX network.

The interface 300 therefore comprises, as stated here above, a set of one or more analog and/or digital modems 301 respectively connected to one or more analog or digital lines L1–Ln connected to the PABX. This modem or these modems are connected to a standardized RS232 coupler 302 including a processor 303 capable of deciphering the messages received or enciphering the messages sent thus providing a secured computer type link in order to connect the interface to the CTI server.

A detailed description shall now be given of an exemplary request for programming telephone call transfers made by an authorized user.

If the user is on the site of the telephone installation, he will request this call transfer, for example from the telecommunications equipment 11A or 11B which is available to him and which he can use to access a WEB site or a voice server. Should the user be outside the site of the installation, then he can make his requests from an external unit of telecommunications equipment giving him access to the WEB site or the voice server 50.

Typically, the user must send his identification, the number of the telephone set from which he wishes to transfer calls, the number of the telephone set to which the calls will be transferred, and his confidential code in order to verify the fact that he is an authorized person, and he must validate his request.

The CTI server receiving this request through the WEB site 50 (or voice server) sends secured control signals (enciphered or certified) on the TCP/IP link for the interface 300.

These commands comprise:
the PABX station substitution code,
the number of the telephone set from which calls are to be transferred;
the user's confidential code on the PABX,
the transfer code or command,
the transfer number,
the command for disconnecting the analog line used by the interface.

The interface generates a corresponding DTMF or voice sequence used to configure the PABX.

In the case of an automatic calling back, the CTI server will drive the interface by sending it the following commands:
the caller's (user's) number,
the detection of the off-hook status of the caller,
the making of a double call with the number of called party,
disconnection or transfer of the line used by the interface.
The calling party is connected with the called party.

In the case of an automatic calling back, the CTI server will drive the interface by sending it the following commands

The invention claimed is:

1. A system for implementing telephone services on one or more telephone installations, the installations comprising several telephone terminals managed by one or more private automatic branch exchanges, the system comprising:
computer equipment comprising a computer telephony integration (CTI) server accessible by a computer network; and
one or more interfaces capable of sending control signals corresponding to a telephone service or services requested to drive one or more automatic branch exchanges, the one or more interfaces connected to telephone lines of the automatic branch exchanges and by a TCP/IP computer link to the server, and the one or more interfaces adapted for operable connection to the CTI server when the CTI server is located in a remote location, the server driving the one or more interfaces.

2. System for the implementation of telephone services according to claim 1, wherein the telephone service requested is a programming of a call transfer from a station of the installation.

3. System for the implementation of telephone services according to claim 2, wherein the call transfer is an automatic transfer of calls addressed to a telephone terminal of an installation to another terminal of the installation or to a terminal external to the installation.

4. System for the implementation of telephone services according to claim 1, wherein the telephone service requested is an automatic calling back of a terminal of a calling party in order to connect the calling terminal with a called terminal.

5. System for the implementation of telephone services according to claim 4, wherein the calling terminal is a terminal of a telephone installation or an external terminal, and wherein the called terminal is a telephone terminal internal or external to the installation.

6. System for the implementation of telephone services, according to claim 1, wherein the telephone service is management of incoming calls for subscribers to the automatic branch exchanges or for a particular service.

7. System for the implementation of telephone services according to claim 1, wherein the one or more interfaces comprise one or more analog or digital modems used to connect the one or more modems to the computer link, the one or more modems being connected to a coupler.

8. System for the implementation of telephone services according to claim 1, wherein the driving of the automatic branch exchange by the server is secured by an authentication procedure or by enciphering of messages sent between the server and the interface.

9. System for the implementation of telephone services according to claim 1, wherein the telephone lines connecting an interface to one or more automatic branch exchanges are analog or digital lines.

10. System for the implementation of telephone services according to claim 1, wherein the interface comprises packs.

11. System for the implementation of telephone services according to claim 1, wherein the control signals are DTMF or ISDN or voice signals.

12. System for the implementation of telephone services according to claim 1, wherein the interface or interfaces are capable of generating signals corresponding to telephone service commands.

13. System for the implementation of telephone services according to claim 12, wherein the telephone service commands are call transfers or automatic calling-back operations or services pertaining to incoming calls.

14. A control device for a private automatic branch exchange comprising:
- a telephone interface connected to telephone lines of the automatic branch exchange to convey signals corresponding to telephone service commands; and
- a computer interface comprising a processor to provide a TCP/IP link with a computer telephone integration (CTI) server and convert the commands/signals between the CTI server and the automatic branch exchange.

15. Control device for a private automatic branch exchange according to claim 14, wherein the commands/signals are DTMF or ISDN or voice signals.

16. Control device for a private automatic branch exchange according to claim 14, wherein the telephone lines connecting the telephone interface to the automatic branch exchange are analog or digital lines.

17. Control device for an automatic branch exchange according to claim 14, wherein the telephone interface comprises one or more analog or digital modems, and coupler used to connect the one or more modems to the computer interface.

18. Control device for an automatic branch exchange according to claim 14, wherein the telephone interface comprises packs.

* * * * *